(12) United States Patent
Lee et al.

(10) Patent No.: US 11,994,715 B2
(45) Date of Patent: May 28, 2024

(54) COMPACT WAVEGUIDE TAPER AND WAVEGUIDE CROSSING

(71) Applicant: ROCKLEY PHOTONICS LIMITED, Altrincham (GB)

(72) Inventors: Jin-Hyoung Lee, Brea, CA (US); Andrea Trita, Pasadena, CA (US)

(73) Assignee: Rockley Photonics Limited, Altrincham (GB)

( * ) Notice: Subject to any disclaimer, the term of this patent is extended or adjusted under 35 U.S.C. 154(b) by 80 days.

(21) Appl. No.: 17/684,265

(22) Filed: Mar. 1, 2022

(65) Prior Publication Data
US 2022/0283369 A1    Sep. 8, 2022

Related U.S. Application Data

(60) Provisional application No. 63/155,705, filed on Mar. 2, 2021.

(51) Int. Cl.
*G02B 6/122*    (2006.01)
*G02B 6/125*    (2006.01)

(52) U.S. Cl.
CPC ........... *G02B 6/1228* (2013.01); *G02B 6/125* (2013.01)

(58) Field of Classification Search
CPC .............................. G02B 6/1228; G02B 6/125
See application file for complete search history.

(56) References Cited

U.S. PATENT DOCUMENTS

2005/0244104 A1\* 11/2005 Payne .................. G02B 6/1228
                                                                385/43

FOREIGN PATENT DOCUMENTS

CN    206818909 U    12/2017

OTHER PUBLICATIONS

Bozeat, R. J. et al., "Silicon Based Waveguides", 2004, pp. 279-284, Springer.
Fu, Y. et al., "Efficient adiabatic silicon-on-insulator waveguide taper", Photon Res., May 14, 2014, pp. A41-A44, vol. 2, No. 3, Chinese Laser Press.
Hiorth, A. et al., "2D constant-loss taper for mode conversion", Proc. of SPIE, 2015, pp. 93571S-1 through S93571S-7, vol. 9357, SPIE.
Latunde-Dada, K. A. et al., "Theory and Design of Adiabatically Tapered Multimode Interference Couplers", Journal of Lightwave Technology, Mar. 2007, pp. 834-839, vol. 25, No. 3, IEEE.
Shinobu, F. et al., "Low-loss simple waveguide intersection in silicon photonics", Electronics Letters, May 10, 2010, 2 pages, vol. 46, No. 16, The Institution of Engineering and Technology.
International Search Report and Written Opinion of the International Searching Authority, dated Jun. 23, 2022, Corresponding to PCT/EP2022/055303, 17 pages.

\* cited by examiner

*Primary Examiner* — Michael P Mooney
(74) *Attorney, Agent, or Firm* — Lewis Roca Rothgerber Christie LLP

(57) ABSTRACT

A tapered waveguide. In some embodiments, the waveguide has a narrow end and a wide end. A taper angle of the waveguide may be, at each point along the waveguide, less than an adiabatic taper angle by a margin. The margin may be greater at a first point than at a second point, where the adiabatic taper angle is less at the first point than at the second point.

20 Claims, 7 Drawing Sheets

| w1[um] | w2[um] | L[um] | m |
|---|---|---|---|
| 1.5 | 8 | 170 | 2 |

FIG. 3

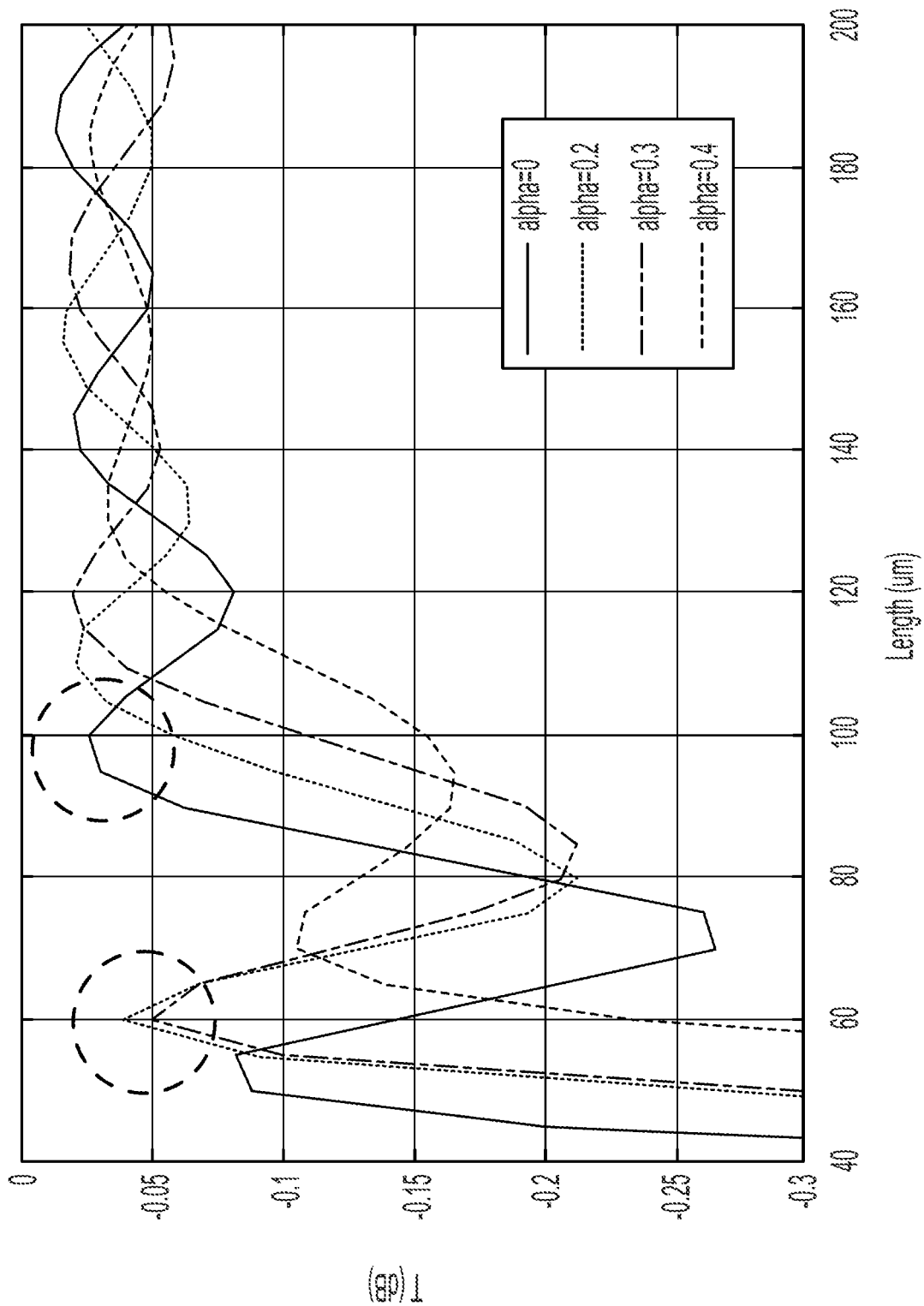

| Design ID | Taper profile | Crossing Square | Taper length (um) | Total length (um) | IL (dB) |
|---|---|---|---|---|---|
| 1 | Nonlinear | 8um | 100 | 208 | 0.033 |
| 2 | Nonlinear | 7um | 80 | 167 | 0.042 |

FIG. 6

COMPACT WAVEGUIDE TAPER AND WAVEGUIDE CROSSING

CROSS-REFERENCE TO RELATED APPLICATION(S)

The present application claims priority to and the benefit of U.S. Provisional Application No. 63/155,705, filed Mar. 2, 2021, entitled "WAVEGUIDE CROSSING BY COMPACT WAVEGUIDE TAPER", the entire content of which is incorporated herein by reference.

FIELD

One or more aspects of embodiments according to the present disclosure relate to photonic integrated circuits, and more particularly to tapered waveguides and waveguide crossings in photonic integrated circuits.

BACKGROUND

Waveguide crossings are useful structures in various photonic integrated circuit designs. Some designs for such crossings, however, may occupy relatively large amounts of chip area, and they may incur relatively large optical losses.

Thus, there is a need for an improved design for a waveguide crossing.

SUMMARY

According to an embodiment of the present disclosure, there is provided a tapered waveguide, having: a narrow end; and a wide end, the tapered waveguide having a taper angle, at each point between the narrow end and the wide end, within 30% of $\Omega_L - \alpha/\Omega_L$, wherein: $\alpha$ is a positive constant, $\Omega_L = \rho/L_B$, $\rho$ is one half of the width of the tapered waveguide at the point, $$L_B = \frac{2\pi}{\beta_1 - \beta_2},$$

$\beta_1$ is a propagation constant, at the point, of a fundamental mode, and $\beta_2$ is a propagation constant, at the point, of a higher order mode with a greatest overlap with the fundamental mode.

In some embodiments, the tapered waveguide has: a width, at the narrow end, within 20% of 1.5 microns, a width, at the wide end, within 20% of 7 microns, and a length, between the narrow end and the wide end, of less than 80 microns.

In some embodiments, the tapered waveguide has an optical loss of less than 0.08 dB.

In some embodiments, a is between 0.1 and 0.4.

According to an embodiment of the present disclosure, there is provided a waveguide crossing, including: a first tapered waveguide, the first tapered waveguide being a tapered waveguide abutting a crossing slab.

In some embodiments, the waveguide crossing further includes: a second tapered waveguide; a third tapered waveguide; and a fourth tapered waveguide, wherein: the crossing slab is a crossing rectangle; the first tapered waveguide, the second tapered waveguide, the third tapered waveguide, and the fourth tapered waveguide abut four respective sides of the crossing rectangle; and the crossing rectangle is configured to allow light to propagate from the first tapered waveguide to the third tapered waveguide, and to allow light to propagate from the second tapered waveguide to the fourth tapered waveguide.

In some embodiments, the crossing rectangle has a side having a length less than 8 microns.

In some embodiments, the crossing rectangle has a side having a length less than 7 microns.

In some embodiments, the first tapered waveguide has: a width, at the narrow end, within 20% of 1.5 microns, a width, at the wide end, within 20% of 7 microns, and a length, between the narrow end and the wide end, of less than 80 microns.

In some embodiments, the first tapered waveguide has an optical loss of less than 0.08 dB.

In some embodiments, a is between 0.1 and 0.4.

According to an embodiment of the present disclosure, there is provided a tapered waveguide, having: a narrow end; and a wide end, the tapered waveguide having: a taper angle, at a first point between the narrow end and the wide end, equal to $\Omega_{L1} - x_1$, and a taper angle, at a second point between the narrow end and the wide end, equal to $\Omega_{L2} - x_2$, wherein: $\Omega_{L1} = \rho_1/L_{B1}$ is an adiabatic taper angle at the first point, $\rho_1$ is one half of the width of the waveguide at the first point, $$L_{B1} = \frac{2\pi}{\beta_{11} - \beta_{21}}$$

is a beat length at the first point, $\beta_{11}$ is a propagation constant, at the first point, of a fundamental mode, $\beta_{21}$ is a propagation constant, at the first point, of a higher order mode with a greatest overlap with the fundamental mode, $\Omega_{L2} = \rho_2/L_{B2}$ is an adiabatic taper angle at the second point, $\rho_2$ is one half of the width of the waveguide at the second point, $$L_{B2} = \frac{2\pi}{\beta_{12} - \beta_{22}}$$

is a beat length at the second point, $\beta_{12}$ is a propagation constant, at the second point, of a fundamental mode, $\beta_{22}$ is a propagation constant, at the second point, of a higher order mode with a greatest overlap with the fundamental mode, $\Omega_{L1} < \Omega_{L2}$, and $x_1 > x_2$.

In some embodiments, the tapered waveguide has: a width, at the narrow end, within 20% of 1.5 microns, a width, at the wide end, within 20% of 7 microns, and a length, between the narrow end and the wide end, of less than 80 microns.

In some embodiments, the tapered waveguide has an optical loss of less than 0.08 dB.

In some embodiments, a is between 0.1 and 0.4.

According to an embodiment of the present disclosure, there is provided a waveguide crossing, including: a first tapered waveguide, the first tapered waveguide being a tapered waveguide abutting a crossing slab.

In some embodiments, the waveguide crossing further includes: a second tapered waveguide; a third tapered waveguide; and a fourth tapered waveguide, wherein: the crossing slab is a crossing rectangle; the first tapered waveguide, the second tapered waveguide, the third tapered waveguide, and the fourth tapered waveguide abut four respective sides of the crossing rectangle; and the crossing rectangle is configured to allow light to propagate from the first tapered waveguide to the third tapered waveguide, and to allow light to propagate from the second tapered waveguide to the fourth tapered waveguide.

In some embodiments, the crossing rectangle has a side having a length less than 8 microns.

In some embodiments, the crossing rectangle has a side having a length less than 7 microns.

In some embodiments, the first tapered waveguide has: a width, at the narrow end, within 20% of 1.5 microns, a width, at the wide end, within 20% of 7 microns, a length, between the narrow end and the wide end, of less than 80 microns, and an optical loss of less than 0.08 dB.

BRIEF DESCRIPTION OF THE DRAWINGS

These and other features and advantages of the present disclosure will be appreciated and understood with reference to the specification, claims, and appended drawings wherein:

FIG. 2 is a taper equation, according to an embodiment of the present disclosure;

FIG. 3 is a table of parameters, according to an embodiment of the present disclosure;

FIG. 4B is a graph of transmission as a function of taper length, according to an embodiment of the present disclosure;

FIG. 6 is a table of waveguide crossing parameters and loss, according to an embodiment of the present disclosure.

DETAILED DESCRIPTION

The detailed description set forth below in connection with the appended drawings is intended as a description of exemplary embodiments of a waveguide taper and waveguide crossing provided in accordance with the present disclosure and is not intended to represent the only forms in which the present disclosure may be constructed or utilized. The description sets forth the features of the present disclosure in connection with the illustrated embodiments. It is to be understood, however, that the same or equivalent functions and structures may be accomplished by different embodiments that are also intended to be encompassed within the scope of the disclosure. As denoted elsewhere herein, like element numbers are intended to indicate like elements or features.

Figure 1A:
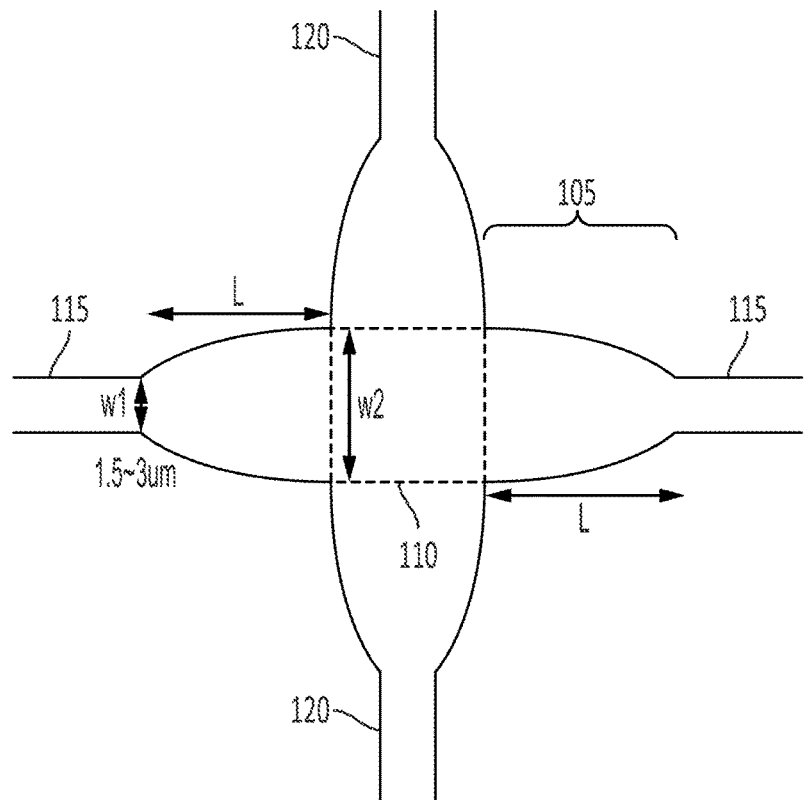
FIG. 1A is a top view of a waveguide crossing, according to an embodiment of the present disclosure.
Figure 1B:
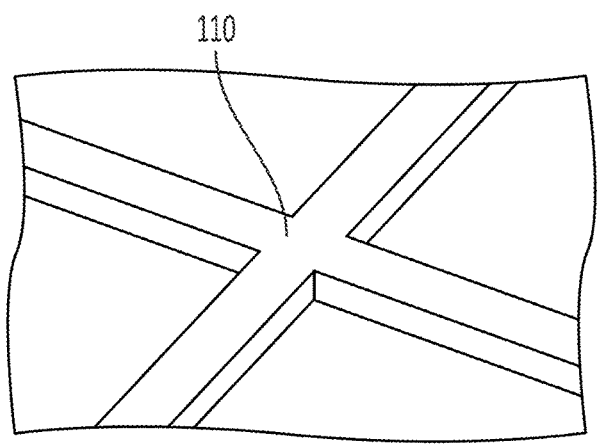
FIG. 1B is a perspective view of a portion of a waveguide crossing, according to an embodiment of the present disclosure.

FIGS. 1A and 1B show a waveguide (WG) crossing. A waveguide crossing may be one of the basic components in a photonic integrated circuit (PIC) design; it may allow two waveguides to cross each other. One common application may be to provide a crossing between north-south and east-west waveguides. Such crossings may help to address the complexity of waveguide routing in a photonic integrated circuit.

A waveguide crossing may include four taper sections (or "tapered waveguides") 105 (of which four are shown in FIG. 1A, and, for ease of illustration, only one is identified with the reference symbol 105), and a crossing square 110, as shown. Each of the tapered waveguides may be a strip waveguide, and the crossing square may be a square region having a height equal to the height of the waveguides. In some embodiments, the crossing square 110 may be replaced with a "crossing slab" of a different shape (e.g., a rectangular shape (in which case the crossing slab may be referred to as a "crossing rectangle" (of which a crossing square is a special case)) or an octagonal shape), to similar effect. Light may propagate across the crossing square 110 between the two east-west waveguides 115 and between the two north-south waveguides 120. Within the crossing square, light may be confined only vertically (i.e., in the direction perpendicular to the plane of the photonic integrated circuit) and a beam launched into the crossing square from any of the waveguides may, as a result of diffraction, spread slightly in the horizontal direction perpendicular to the direction of propagation, causing loss and cross-talk. The widths w2 of the waveguides at the crossing square may be selected to be sufficiently great that the loss and cross-talk due to beam spreading (which is generally smaller, the wider the waveguides are), is acceptable. Far from the crossing, the waveguides may have a width, or "default width" w1, (e.g., approximately between 1.5 microns and 3.0 microns) selected to provide acceptable wave guiding characteristics (e.g., the ability to guide light through bends of acceptable radius with acceptable loss, and acceptable suppression of, or coupling into, higher order modes). In some designs, relatively long tapers may be used to achieve, starting from the default width, the waveguide width at the crossing square, without incurring unacceptable loss in the tapers. Linear, parabolic, or exponential-shaped tapers may be used.

FIG. 1A is not drawn to scale. For example, the aspect ratio (the ratio of the length to the width) of each of the tapers is significantly reduced in FIG. 1, so that the taper and the shape of the taper may be more readily perceptible. In some embodiments, for example, the ratio of the length of the taper to the width of the waveguide at the wide end of the taper is about 10.0. FIG. 1B shows a perspective view of a crossing square, in some embodiments. FIG. 1B is drawn to scale for one embodiment, in which the taper angle of the waveguides is sufficiently small that it is not readily perceptible.

For example, in some embodiments, a waveguide crossing uses a nonlinear (e.g., parabolic) shaped taper in each waveguide as it approaches the crossing square 110 of the waveguide crossing. The tapers may, for example, each have the nonlinear shape given by the taper equation of FIG. 2. The table of FIG. 3 shows that a taper length of 170 microns may be used to increase the waveguide width from 1.5 to a width of 8 microns, if a value of m=2 (corresponding to a parabolic taper) is used in the taper equations shown. For a taper length of 170 um (microns), the total device footprint may be about 340×340 um^2.

In some embodiments, a nonlinear taper shape, or "width profile" based on a local mode beat length calculation is used instead. As used herein, the "width profile" of a length of waveguide is the width of the waveguide as a function of distance along the waveguide (i.e., as a function of position, in the length direction, on the waveguide).

As discussed in "Silicon Based Waveguides", by R. J. Bozeat, S. Day, and F. Hopper (Springer 2004), it may be shown that generally a taper angle satisfying an adiabatic limit generally will have relatively low loss where a taper not satisfying the adiabatic limit will generally be lossy. The taper angle corresponding to the adiabatic limit (which may also be referred to herein as the "adiabatic taper angle") $\Omega_L$ may be calculated as $$\Omega_L = \rho/L_B,$$

where (i) $\rho$ is one half of the width of the waveguide, (ii) $L_B$, given by:

$$L_B = \frac{2\pi}{\beta_1 - \beta_2}$$

is the beat length between the fundamental mode and a higher-order mode with which it has the greatest overlap, (iii) $\beta_1$ is the propagation constant of the fundamental mode, and (iv) $\beta_2$ is the propagation constant of the higher-order mode. The beat length between the fundamental mode and the higher-order mode, and the taper angle at the adiabatic limit, may each be a non-linear function of the width and taper angle. As used herein, the "taper angle" of a waveguide is one half of the rate of change of width of the waveguide with respect to length along the waveguide.

As such, a tapered waveguide may be designed by (i) generating an initial waveguide taper having everywhere along its length a local taper angle that just meets the adiabatic limit, and (ii) sweeping the length of the waveguide, i.e., stretching the waveguide in the length direction, while at each of various length values, calculating the expected loss using a simulation. The shortest length at which the loss is acceptable may then be used in the design of the waveguide crossing.

In some embodiments, an improvement in performance over this approach may be made using a tapered waveguide with a modified width profile. Recognizing that at points along the waveguide at which the taper angle at the adiabatic limit is small are also points at which the loss is more sensitive to taper angle, a modified taper angle $\Omega$ may be defined as follows, as a function of a "taper shape parameter" $\alpha$:

$$\Omega = \Omega_L - \alpha/\Omega_L. \quad (1)$$

The taper shape parameter $\alpha$ may be a positive constant, i.e., a positive number that does not vary along the length of the taper. If this expression is used, the margin $\alpha/\Omega_L$ (the amount by which the modified taper angle is less than the taper angle at the adiabatic limit) is greater where the taper angle at the adiabatic limit is smaller (e.g., the margin at a first point along the taper may be greater than the margin at a second point along the taper, when the adiabatic taper angle is less at the first point than at the second point). In some embodiments, a taper having a modified taper angle $\Omega$ related to the adiabatic taper angle $\Omega_L$ by a different functional relationship (e.g., another functional relationship in which the margin is greater for smaller adiabatic taper angles, such as $\Omega = \Omega_L - \alpha\Omega_L^{-\beta}$) may be employed.

Figure 4A:
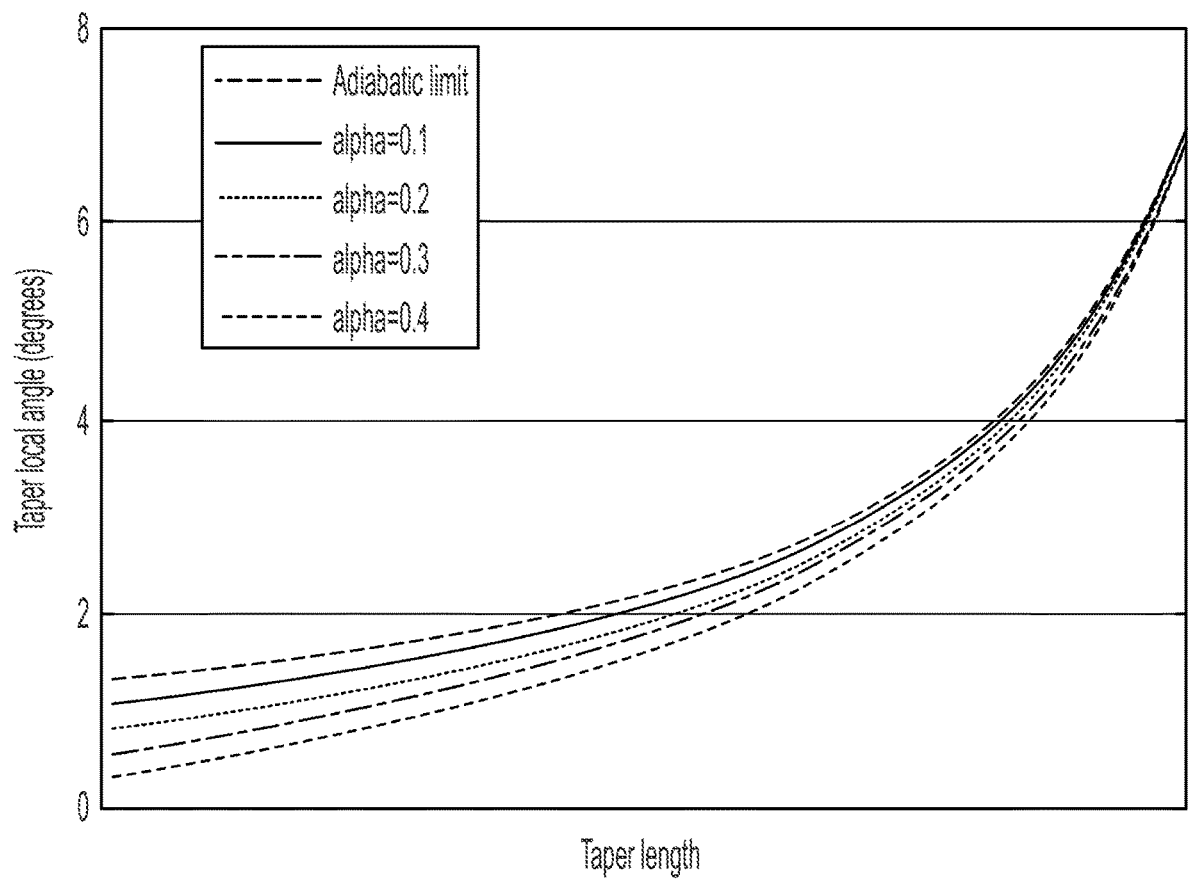
FIG. 4A is a graph of taper angle as a function of position along a taper, according to an embodiment of the present disclosure.

Based on Equation (1), a tapered waveguide may be designed by finding, within a two-dimensional parameter space, a design that has both acceptable loss and acceptable length. The two parameters defining the two-dimensional parameter space may be the taper shape parameter $\alpha$ and the length of the tapered waveguide (or the "taper length"). FIG. 4A shows the variation of the taper angle along the length of the tapered waveguide for various values of the taper shape parameter $\alpha$.

In some embodiments a width profile similar to, but not identical to, the "nominal" width profile (the nominal width profile being the width profile of a tapered waveguide having, at every point along its length, a taper angle equal to the modified taper angle $\Omega$), may be used. For example, (i) the width profile used may, at every point along the waveguide, have a width within 0.5 microns (or within a number between 0.1 microns and 2.0 microns) of the width of the nominal width profile, or (ii) the width profile used may have a width, at every point along the waveguide, within 20% (or within a number between 1% and 50%) of the width of the nominal width profile, or (iii) the width profile used may have, at every point along the waveguide, a taper angle within 0.1 degrees (or within a number between 0.01 degrees and 2.00 degrees) of the taper angle of the nominal width profile, or (iv) the width profile used may have, at every point along the waveguide, a taper angle within 20% (or within a number between 1% and 50%) of the taper angle of the nominal width profile.

FIG. 4B shows the simulated fundamental-mode transmission of the tapered waveguide (i.e., the fraction T of light transmitted through the tapered waveguide), as a function of the length of tapered waveguide, for various values of the taper shape parameter $\alpha$. It may be seen for, example, that for $\alpha$=0.2 a taper, having a width of 1.5 microns at the narrow end and a width of 8 microns at the wide end, with a length of only 60 um has only about 0.04 dB of loss, and that for $\alpha$=0 a taper with a length of 100 um has about 0.025 dB of loss. In some embodiments, a tapered waveguide having (i) a width between 0.5 microns and 5 microns at the narrow end, (ii) a width between 5 microns and 10 microns at the wide end, and (ii) a length between 30 microns and 80 microns, may have a loss between 0.02 dB and 0.1 dB.

The crossing square of the waveguide crossing may also be adjusted to reduce the footprint (or to reduce the loss), of the waveguide crossing. The smaller the edge length w2 of the crossing square of the waveguide crossing is, the shorter the tapered waveguides may be, and, therefore, the smaller the chip area occupied by the waveguide crossing. It may be seen from the graph of FIG. 5A (which shows simulated fundamental mode transmission through the crossing square as a function of the side length of the crossing square) that if the crossing square size is reduced from 8 microns to 6 microns, the loss increases from about 0.026 dB only to about 0.038 dB. It may also be seen from the graph of FIG. 5B (which shows simulated crosstalk (XT) as a function of the side length of the crossing square) that if the crossing square size is reduced from 8 microns to 6 microns, the crosstalk increases from about −73 dB only to about −72 dB. As such, in some embodiments, a waveguide crossing with a crossing square having a size between 5 um and 11 microns (e.g., a size of 7 um or 6 um) may be used. The results of FIGS. 4B, 5A and 5B were obtained using a 3-dimensional finite-difference time-domain (3D FDTD) method.

Figure 5A:
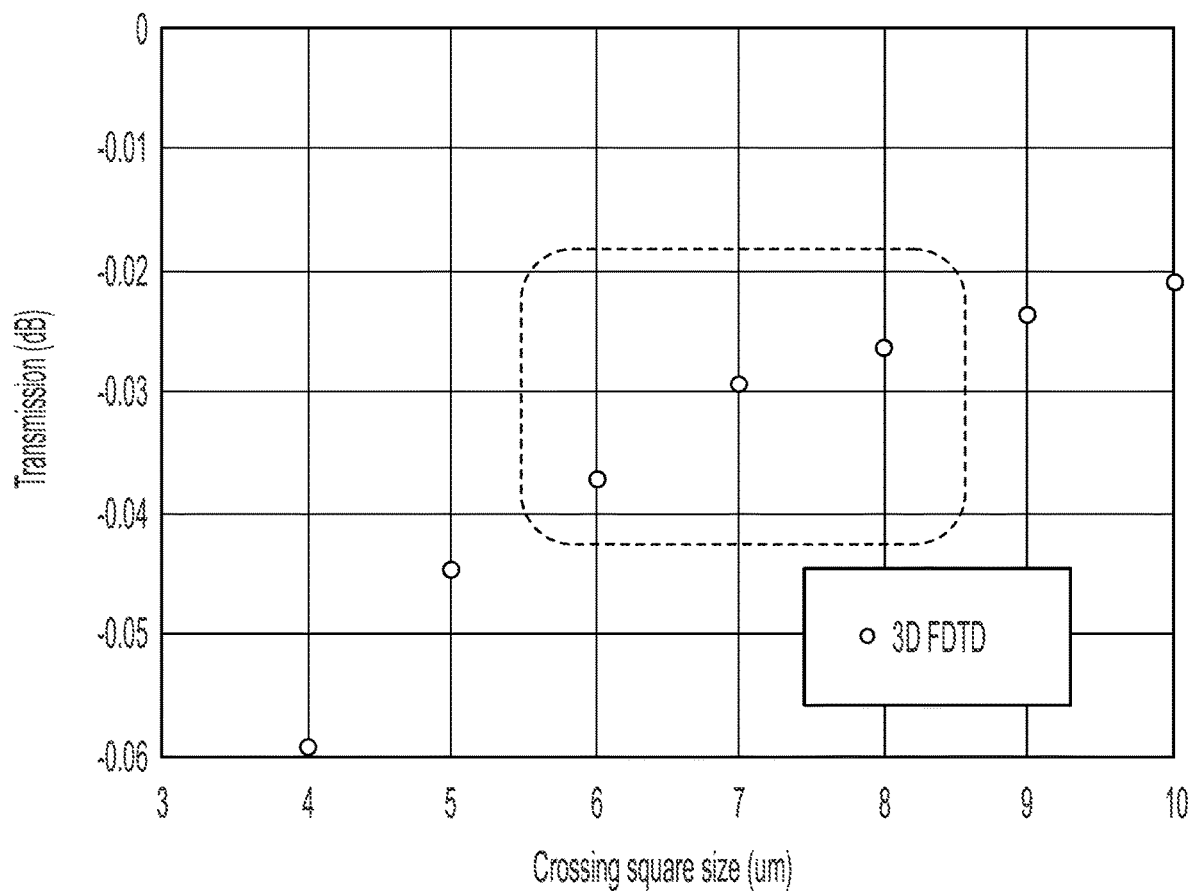
FIG. 5A is a graph of transmission as a function of crossing square size, according to an embodiment of the present disclosure.
Figure 5B:
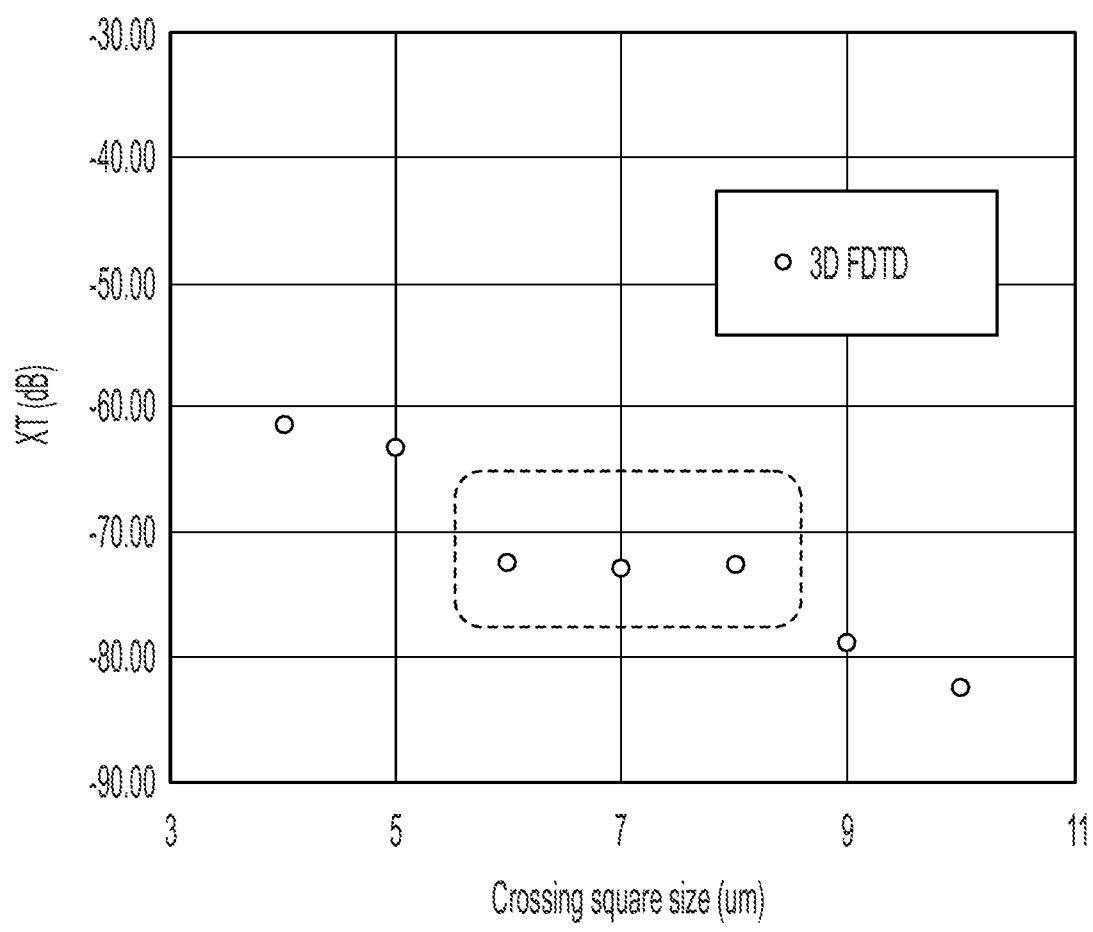
FIG. 5B is a graph of crosstalk as a function of crossing square size, according to an embodiment of the present disclosure.

In some embodiments, the combined effect of using (i) a modified taper angle according to Equation (1), with a taper shape parameter $\alpha$ of 0.2 and (ii) a crossing square size of 6 um may result in a reduction of more than a factor of two in the lengths of the tapered waveguides, and a reduction of more than a factor of 4 in the area occupied by the waveguide crossing. The table of FIG. 6 shows design parameters for two examples of crossing square designs, in which the insertion loss is 0.033 dB and 0.042 respectively. It may be seen that, for a crossing square size of 8 microns, for example, the total insertion loss, through the waveguide crossing (e.g., 0.033 dB, as shown in table of FIG. 6), is less than the sum of (i) the loss through the crossing square (e.g., 0.026 dB, as shown in FIG. 5A) and (ii) twice the loss through either of the tapered waveguides (e.g., twice 0.025 dB, as shown in FIG. 4B, for α=0.0). This may be caused by power that is coupled into one or more higher order modes in a first tapered waveguide (e.g., an input waveguide) being coupled back into the fundamental mode in the opposite (output) waveguide.

As used herein, "a portion of" something means "at least some of" the thing, and as such may mean less than all of, or all of, the thing. As such, "a portion of" a thing includes the entire thing as a special case, i.e., the entire thing is an example of a portion of the thing. As used herein, the term "rectangle" includes a square as a special case, i.e., a square is an example of a rectangle, and the term "rectangular" encompasses the adjective "square". As used herein, when a second quantity is "within Y" of a first quantity X, it means that the second quantity is at least X−Y and the second quantity is at most X+Y. As used herein, when a second number is "within Y %" of a first number, it means that the second number is at least (1−Y/100) times the first number and the second number is at most (1+Y/100) times the first number. As used herein, the word "or" is inclusive, so that, for example, "A or B" means any one of (i) A, (ii) B, and (iii) A and B.

As used herein, when a method (e.g., an adjustment) or a first quantity (e.g., a first variable) is referred to as being "based on" a second quantity (e.g., a second variable) it means that the second quantity is an input to the method or influences the first quantity, e.g., the second quantity may be an input (e.g., the only input, or one of several inputs) to a function that calculates the first quantity, or the first quantity may be equal to the second quantity, or the first quantity may be the same as (e.g., stored at the same location or locations in memory as) the second quantity.

Any numerical range recited herein is intended to include all sub-ranges of the same numerical precision subsumed within the recited range. For example, a range of "1.0 to 10.0" or "between 1.0 and 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein.

Although exemplary embodiments of a waveguide taper and waveguide crossing have been specifically described and illustrated herein, many modifications and variations will be apparent to those skilled in the art. Accordingly, it is to be understood that a waveguide taper and waveguide crossing constructed according to principles of this disclosure may be embodied other than as specifically described herein. The invention is also defined in the following claims, and equivalents thereof.

What is claimed is:

1. A tapered waveguide, having:
    a narrow end; and
    a wide end,
    the tapered waveguide having:
        a taper angle, at a first point between the narrow end and the wide end, equal to $\Omega_{L1}-x_1$, and
        a taper angle, at a second point between the narrow end and the wide end, equal to $\Omega_{L2}-x_2$,
    wherein:
        $\Omega_{L1}=\rho_1/L_{B1}$ is an adiabatic taper angle at the first point,
        $\rho_1$ is one half of the width of the waveguide at the first point, $$L_{B2} = \frac{2\pi}{\beta_{12} - \beta_{22}}$$

is a beat length at the first point,
$\rho_{11}$ is a propagation constant, at the first point, of a fundamental mode,
$\beta_{21}$ is a propagation constant, at the first point, of a higher order mode with a greatest overlap with the fundamental mode,
$\Omega_{L2}=\rho_2/L_{B2}$ is an adiabatic taper angle at the second point,
$\rho_2$ is one half of the width of the waveguide at the second point, $$L_{B2} = \frac{2\pi}{\beta_{12} - \beta_{22}}$$

is a beat length at the second point,
$\beta_{12}$ is a propagation constant, at the second point, of a fundamental mode,
$\beta_{22}$ is a propagation constant, at the second point, of a higher order mode with a greatest overlap with the fundamental mode,
$\Omega_{L1}<\Omega_{L2}$, and
$x_1>x_2$.

2. The tapered waveguide of claim 1,
    wherein the tapered waveguide has a taper angle, at each point between the narrow end and the wide end, within 30% of $\Omega_L-\alpha/\Omega_L$,
    wherein:
        α is a positive constant,
        $\Omega_L=\rho/L_B$,
        ρ is one half of the width of the tapered waveguide at the point, $$L_{B1} = \frac{2\pi}{\beta_{11} - \beta_{12}}$$

$\beta_1$ is a propagation constant, at the point, of a fundamental mode, and
$\beta_2$ is a propagation constant, at the point, of a higher order mode with a greatest overlap with the fundamental mode.

3. The tapered waveguide of claim 2, wherein the tapered waveguide has:
    a width, at the narrow end, within 20% of 1.5 microns,
    a width, at the wide end, within 20% of 7 microns, and
    a length, between the narrow end and the wide end, of less than 80 microns.

4. The tapered waveguide of claim 3, wherein the tapered waveguide has an optical loss of less than 0.08 dB.

5. The tapered waveguide of claim 2, wherein α is between 0.1 and 0.4.

6. A waveguide crossing, comprising:
    a first tapered waveguide, the first tapered waveguide being a tapered waveguide according to claim 1, abutting a crossing slab.

7. The waveguide crossing of claim 6, further comprising:
    a second tapered waveguide;
    a third tapered waveguide; and a fourth tapered waveguide,
wherein:
   the crossing slab is a crossing rectangle;
   the first tapered waveguide, the second tapered waveguide, the third tapered waveguide, and the fourth tapered waveguide abut four respective sides of the crossing rectangle; and
   the crossing rectangle is configured to allow light to propagate from the first tapered waveguide to the third tapered waveguide, and to allow light to propagate from the second tapered waveguide to the fourth tapered waveguide.

8. The waveguide crossing of claim 7, wherein the crossing rectangle has a side having a length less than 8 microns.

9. The waveguide crossing of claim 8, wherein the crossing rectangle has a side having a length less than 7 microns.

10. The waveguide crossing of claim 6, wherein the first tapered waveguide has:
   a width, at the narrow end, within 20% of 1.5 microns,
   a width, at the wide end, within 20% of 7 microns, and
   a length, between the narrow end and the wide end, of less than 80 microns.

11. The waveguide crossing of claim 10, wherein the first tapered waveguide has an optical loss of less than 0.08 dB.

12. The waveguide crossing of claim 6, wherein $\alpha$ is between 0.1 and 0.4.

13. The tapered waveguide of claim 1, wherein the tapered waveguide has:
   a width, at the narrow end, within 20% of 1.5 microns,
   a width, at the wide end, within 20% of 7 microns, and
   a length, between the narrow end and the wide end, of less than 80 microns.

14. The tapered waveguide of claim 1, wherein the tapered waveguide has an optical loss of less than 0.08 dB.

15. The tapered waveguide of claim 1, wherein $\alpha$ is between 0.1 and 0.4.

16. A waveguide crossing, comprising:
   a first tapered waveguide, the first tapered waveguide being a tapered waveguide according to claim 1, abutting a crossing slab.

17. The waveguide crossing of claim 16, further comprising:
   a second tapered waveguide;
   a third tapered waveguide; and
   a fourth tapered waveguide,
wherein:
   the crossing slab is a crossing rectangle;
   the first tapered waveguide, the second tapered waveguide, the third tapered waveguide, and the fourth tapered waveguide abut four respective sides of the crossing rectangle; and
   the crossing rectangle is configured to allow light to propagate from the first tapered waveguide to the third tapered waveguide, and to allow light to propagate from the second tapered waveguide to the fourth tapered waveguide.

18. The waveguide crossing of claim 17, wherein the crossing rectangle has a side having a length less than 8 microns.

19. The waveguide crossing of claim 18, wherein the crossing rectangle has a side having a length less than 7 microns.

20. The waveguide crossing of claim 16, wherein the first tapered waveguide has:
   a width, at the narrow end, within 20% of 1.5 microns,
   a width, at the wide end, within 20% of 7 microns,
   a length, between the narrow end and the wide end, of less than 80 microns, and an optical loss of less than 0.08 dB.

* * * * *